March 17, 1964 H. R. COCHRANE ETAL 3,125,224

WALL MOUNTED TELEPHONE BOOK RACK

Filed Jan. 23, 1963

INVENTORS.

HARRY R. COCHRANE

JOHN A. DANIELI

Harry R. Cochrane

United States Patent Office 3,125,224
Patented Mar. 17, 1964

3,125,224
WALL MOUNTED TELEPHONE BOOK RACK

Harry R. Cochrane, 1 Cross St., Saugus, Mass., and John A. Danieli, Saugus, Mass. (34 Moreland St., Somerville, Mass.)
Filed Jan. 23, 1963, Ser. No. 253,462
6 Claims. (Cl. 211—106)

Figures 1, 2:
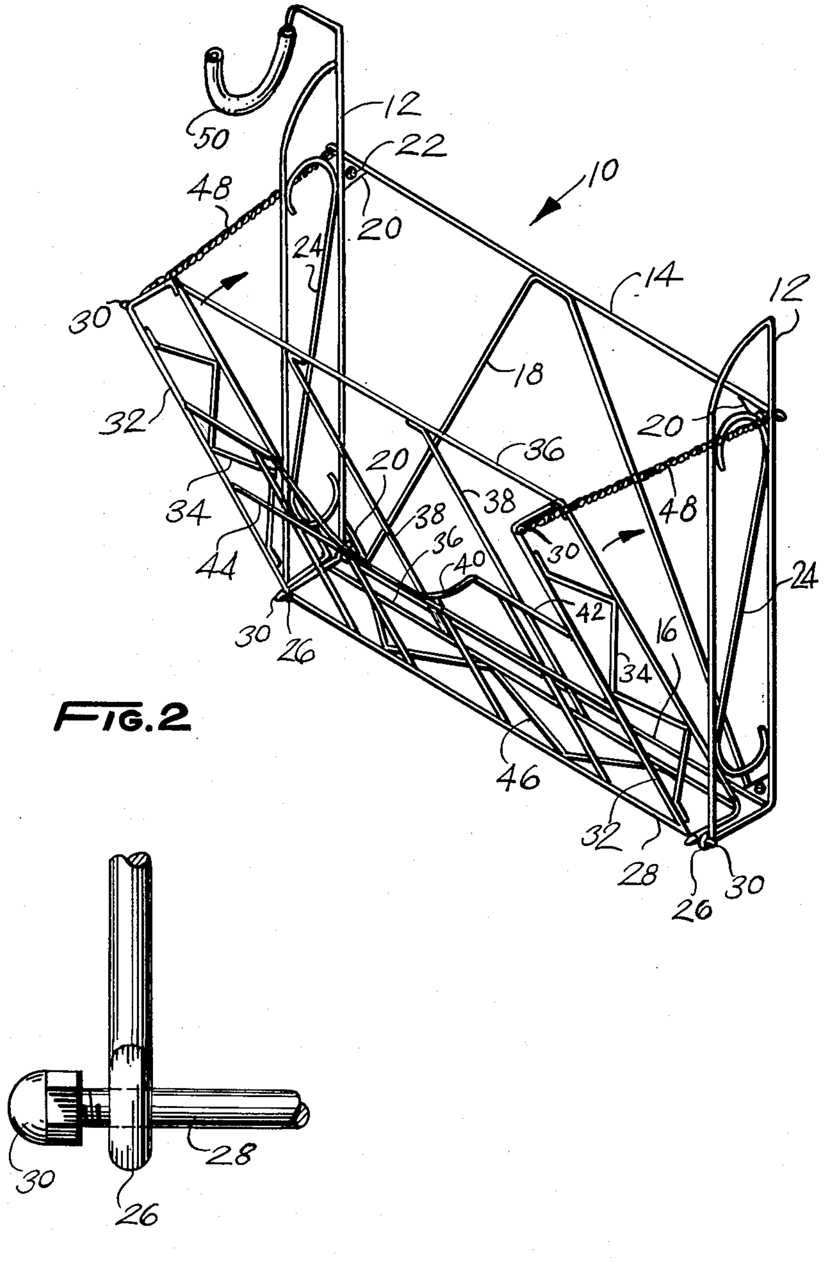

This invention relates to wire book racks and more particularly to a wall mounted telephone book rack.

It is an object of the present invention to provide a wall mounted telephone book rack which will hold the telephone book and will have a smaller compartment which will hold a phone book of personal and emergency telephone numbers.

Another object of the present invention is to provide a telephone book rack which will have a rubber or plastic covered bracket on one corner which will provide a convenient hook for the telephone.

A further object of the present invention is to provide a telephone book rack which will have a pivotable tilt out basket compartment providing a second compartment for retaining a book and will have hinge means of a wire rod pivotable within looped ends of the side frames which will be secured to the wall.

Other objects of the invention are to provide a telephone book rack bearing the above objects in mind which is of simple construction, has a minimum number of parts, is inexpensive to manufacture and efficient in operation.

For other objects and for a better understanding of the invention reference may be had to the following detailed description taken in conjunction with the accompanying drawing, in which:

FIGURE 1 is a perspective view of a telephone book rack comprising the present invention; and FIGURE 2 is an enlarged fragmentary view showing one of the hinged members of the invention.

Referring now more in detail to the drawing, a wall mounted telephone book rack 10 made in accordance with the present invention is shown to include a pair of parallel side frames 12 which are arcuately curved at the top front and made of wire. Side frames 12 are fixedly secured to a pair of parallelly spaced apart cross bar members 14 and 16. An inverted V-shaped configurated wire bar 18 is fixedly secured between horizontal bars 14 and 16 providing rigidity for the back portion of rack 10 and a triangular configurated gusset 20 is fixedly secured in the corners of the wall sections and gussets 20 are provided with circular openings for receiving suitable fastening means which will support rack 10. An elongated S-shaped configurated wire frame 24 is fixedly secured vertically within the side frames 12. The front lower portion of side frames 12 is bent to form a loop 26 which receives the threaded end of horizontal bar 28 which is pivotable within loop 26. Rod 28 threadingly receives acorn nuts 30 which will secure the front basket compartment to side frames 12. A pair of parallelly spaced apart side frames 32 are fixedly secured to the outsides of sawtoothed frames 34 and a pair of parallelly spaced apart cross bars 36 are secured to the rear upper and rear lower portions of side frames 32. A pair of U-shaped configurated parallelly spaced apart vertical bars 38 are fixedly secured between rods 36. A semi-circular configurated opening 40 within horizontal cross bar 42 provides a means for easy removal of the personal directory bluebook from the compartment defined in the hingable pivotable basket. Bar 42 is parallel to a cross bar 44 which is fixedly secured to frames 32 and a sawtoothed frame 46 is fixedly secured between bars 28 and thus provides a bottom for the pivotable compartment. A pair of chains 48 are secured to the front of the pivotable compartment exterior of it at one end and secured at their other ends to cross bar 14 by a plurality of acorn nuts 30 thus limiting forward arcuate movement of the front basket compartment of rack 10.

In operation, suitable wall fasteners are received through the openings 22 of gussets 20 of the back frame of rack 10 and will support rack 10 near the telephone. The telephone directory is received in the compartment defined by side frames 32, also the bluebook of personal telephone numbers is received between the side frames 32. The front compartment defined by side frames 32 is pivotable outward upon the rod 28 which is pivotably received within loops 26 and is prevented from further forward motion by the parallel chains 48. The bluebook is lifted upward and out of the basket compartment of rack 10 and a telephone book received within the swing-out compartment is lifted upward by the individual and lifted out so that they may look up a number. The hook 50 provides a means for supporting the telephone if desired and is covered with a suitable rubber or plastic tubing thus preventing the marring of the telephone.

It shall thus be recognized that the telephone book wall rack can be made in various sizes and may have a plurality of basket compartments hingable to a front compartment for other uses as well as for receiving telephone books.

While various changes may be made in the detail construction it shall be understood that such changes shall be within the spirit and scope of the present invention as defined by the appended claims.

What we claim as new and desire to protect by Letters Patent of the United States is:

1. A wall mounted telephone book rack comprising, in combination, a pair of wire side frames, a plurality of cross bars carried by said side frames, a plurality of gussets of substantially triangular configuration carried by said side frames for receiving suitable fastening means to secure said rack to a wall near a telephone, a pair of substantially S shaped wire frames carried by said side frames and a substantially V-shaped wire frame providing stiffening means for said side frames, a second pair of parallel side frames received pivotably within said first pair of side frames, a pair of sawtooth frames received within said second pair of side frames, a plurality of vertical and a plurality of horizontal cross bars providing rigidity between said second side frames, a pair of chains secured to said first and second pair of side frames limiting the pivotable movement forward of said second pair of side frames, a hook carried by said first side frames providing means for supporting a telephone, a pair of parallelly spaced apart bottom bars and a sawtooth frame received within said bottom bars providing a base for the smaller compartment in front of said rack.

2. A combination according to claim 1, wherein said first side frames provide a compartment means for receiving a telephone book and one of said side frames has a rubber or plastic covered hook for receiving said telephone above said rack and said first pair of side frames are arcuate at the upper ends and square at the lower ends and said S frames are secured between said wires of said side frames thus providing rigidity for said side frames.

3. A combination according to claim 2, wherein said second pair of side frames are secured to a front horizontal cross bar, said cross bar being threaded on each end and threadingly receiving an acorn nut, and said cross bar provides support means for the front compartment of said rack and said front compartment provides a means for receiving a bluebook of personal telephone numbers.

4. A combination according to claim 3, wherein said chains are secured to the rear of said rack and to the front upper ends of said second pair of parallelly spaced apart side walls defining the smaller compartment of said rack and said chains thus limit the forward motion of said second pair of side frames.

5. A combination according to claim 4, wherein said second pair of side frames when said rack is in closed position are received between said first pair of side walls which extend above said second pair of side walls.

6. A combination according to claim 5, wherein said front compartment of said rack is provided with a substantially semi-circular opening in the top cross bar and said top cross bar is parallel with said bottom cross bar in the front of said pivotable compartment and is parallel with said cross bars in the rear of said rack and said loops at the ends of said first pair of side frames provide bearing means for said bar received within said loops.

References Cited in the file of this patent

UNITED STATES PATENTS

| | | |
|---|---|---|
| 1,015,076 | Robert | Jan. 16, 1912 |
| 1,681,418 | Livesay | Aug. 21, 1928 |
| 1,706,081 | Schulze | Mar. 19, 1929 |
| 2,221,659 | Wilkie | Nov. 12, 1940 |